May 5, 1959     J. L. MYRACLE ET AL     2,885,613
BINARY COMPARATOR SYSTEM FOR POSITION CONTROL SYSTEMS
Filed March 26, 1958     3 Sheets-Sheet 1

INVENTORS:
JAMES L. MYRACLE,
MURRAY ROSENBLATT,

BY *Melvin M. Goldenberg*
THEIR ATTORNEY.

FIG.3

| | $C^*$ | $C_2$ | $C_1$ | $C_0$ | | $P^*$ | $P_2$ | $P_1$ | $P_0$ |
|---|---|---|---|---|---|---|---|---|---|
| 0 | 0 | 0 | 0 | 0 | | 0 | 0 | 1 | 0 |
| 1 | 0 | 0 | 0 | 1 | | 0 | 0 | 1 | 1 |
| 2 | 0 | 0 | 1 | 0 | | 0 | 1 | 0 | 0 |
| 3 | 0 | 0 | 1 | 1 | | 0 | 1 | 0 | 1 |
| 4 | 0 | 1 | 0 | 0 | | 0 | 1 | 1 | 0 |
| 5 | 0 | 1 | 0 | 1 | | 0 | 1 | 1 | 1 |
| 6 | 0 | 1 | 1 | 0 | | 1 | 0 | 0 | 0 |
| 7 | 0 | 1 | 1 | 1 | | 1 | 0 | 0 | 1 |
| 8 | 1 | 0 | 0 | 0 | | 1 | 0 | 1 | 0 |
| 9 | 1 | 0 | 0 | 1 | | 1 | 0 | 1 | 1 |
| 10 | 1 | 0 | 1 | 0 | | 1 | 1 | 0 | 0 |
| 11 | 1 | 0 | 1 | 1 | | 1 | 1 | 0 | 1 |
| 12 | 1 | 1 | 0 | 0 | | 1 | 1 | 1 | 0 |
| 13 | 1 | 1 | 0 | 1 | | 1 | 1 | 1 | 1 |
| 14 | 1 | 1 | 1 | 0 | | 0 | 0 | 0 | 0 |
| 15 | 1 | 1 | 1 | 1 | | 0 | 0 | 0 | 1 |
| 16 | 0 | 0 | 0 | 0 | | 0 | 0 | 1 | 0 |
| 17 | 0 | 0 | 0 | 1 | | 0 | 0 | 1 | 1 |
| 18 | 0 | 0 | 1 | 0 | | 0 | 1 | 0 | 0 |
| | ETC. | | | | | ETC. | | | |

FIG.4

INVENTORS:
JAMES L. MYRACLE,
MURRAY ROSENBLATT,

BY *Melvin M. Goldberg*

THEIR ATTORNEY.

INVENTORS:
JAMES L. MYRACLE,
MURRAY ROSENBLATT,

BY Melvin M. Goldenberg
THEIR ATTORNEY.

United States Patent Office 2,885,613
Patented May 5, 1959

2,885,613

BINARY COMPARATOR SYSTEM FOR POSITION CONTROL SYSTEMS

James L. Myracle and Murray Rosenblatt, Waynesboro, Va., assignors to General Electric Company, a corporation of New York Application March 26, 1958, Serial No. 724,055

9 Claims. (Cl. 318—28)

The present invention relates to servomechanisms and more particularly to a servomechanism employing digital representations of a position command signal and a digital representation of the actual position of the servomechanism and to a conversion means for producing an analogue voltage having a magnitude and polarity determined by the relative magnitudes of the two digital signals. Although the apparatus of the present invention is not limited to control of a specific load device, it is particularly adapted to utilization with a machine tool control mechanism and therefore is described as applied to such a system.

Analogue control mechanisms for apparatus such as machine tools and related apparatus are well-known in the art and in some forms constitute a command voltage source for producing a voltage which may be varied in magnitude and polarity in accordance with the desired magnitude and direction of deviation of a controlled element from a given base or reference position. The command signal is compared with a voltage signal indicative of the instantaneous actual position of the element to be controlled and the difference between these two signals constitutes an error signal which is employed to control a motor which positions the aforesaid elements. The direction of movement of the motor in response to the error signal is such as to tend to reduce the instantaneous error signal to zero. Such systems are, in some instances, a part of programmed position control systems which utilize data stored in media such as magnetic tape, punched cards or punched tape. Techniques have been developed for the utilization of digital computers for the preparation of these programs. Consequently, at some point in an overall system comprising a computer, data storage medium, reader and servo, a digital to analogue converter must be included if the servo is of the analogue variety.

Therefore, it has been proposed as an alternative to analogue systems to utilize digital servomechanisms wherein the desired position in relation to a datum point of an element is represented by a digitally coded number such as by a binary code, the actual position of the servomechanism is represented by a second digitally coded number and an analogue voltage error signal is produced having a magnitude and polarity indicative of the relative magnitudes of the two coded numbers. These systems may be designated digital word address systems. Other varieties of digital servomechanisms utilize a series of command pulses wherein each pulse has an incremental value of position change and provides a shaft digitizer or similar means to develop feedback pulses. The command pulses and feedback pulses are compared to derive the analogue voltage error signal. Such systems may be characterized as pulse departure systems. These systems may be more economically designed to have a greater accuracy than their analogue counterparts since the position command signal and the position achieved signal are represented by a plurality of discrete voltages all of the same magnitude, which voltages may be generated by highly accurate electrical or mechanical elements. The only members of the system which deal with analogue quantities are the digital to analogue converter and the servomotor control circuits. The converters normally employ only resistive members in which errors may be minimized by appropriate selection of resistive materials.

The difficulty with prior art digital servomechanisms and primarily those mechanisms employing binary coded control numbers, lies in the fact that such extremely large and cumbersome binary numbers must be employed thereby necessitating extensive storage registers and large digital to analogue conversion systems capable of handling the large binary numbers. Specifically and referring now to a particular example, if it is desired to produce a digital servo applied to a lathe and having an accuracy of 1/1000 of an inch over a workpiece which is two feet long, the binary number required to represent each discrete position along the machine bed must constitute a minimum of 15 digits. It is immediately apparent that much of the advantage resulting from the utilization of digital servomechanisms is lost in a system requiring two sets of binary numbers of 15 digits apiece. In such a system the digital to analogue converter would require thirty distinct conversion stages and in those systems requiring storage registers, thirty distinct stages of binary storage would also have to be provided.

It is, therefore, an object of the present invention to provide a digital servomechanism which permits the utilization of binary numbers having a relatively small number of digits without sacrificing any of the desired accuracy of the system.

It is another object of the present invention to provide a digital servomechanism employing a cyclic binary code for representing desired and actual positions of the mechanism and requiring a relatively small number of binary digits for representing both desired and actual positions.

In order to explain the theory of the present invention, reference is initially made to the table of binary numbers appearing immediately below which comprises two sets of five order binary numbers separated by a column of decimal numbers which indicate the decimal value of the binary numbers to the left thereof. The left-hand column of binary numbers is intended to indicate a series of command numbers each representing a distinct desired position of a motor or a member driven thereby. The binary numbers to the right of the column of decimal numbers represents the actual position of the member at any given instant. It is assumed for the purposes of explanation that the response of the positioning mechanisms is such that the number representing the actual position of the apparatus lags behind the control number which indicates desired position, by only two numbers; that is, if it is assumed that each number represents a thousandth of an inch displacement from the position represented by the next higher or lower number that the apparatus lags behind the control position by two one-thousandths of an inch. Although the table includes two binary numbers of only five orders, it can be appreciated that where a resolution of a thousandth of an inch over a cycle of the same given length is to be established, the binary numbers would be considerably larger than those indicated.

As previously indicated, it is an object of the invention to eliminate the need for carrying the entire number through the apparatus and preferably to only employ a few of the least significant digits of a number in the actual sensing and control mechanisms. For purposes of example, it is assumed that only the two least significant digits of both columns of the binary numbers are considered. Since two binary digits can register four distinct numbers or positions and since the apparatus is assumed to lag behind a desired position by a distance represented by only two numbers, the difference between the two position numbers is always less than the capacity of the two digit numbers employed. In consequence, it would appear that so long as the mechanism operates under normal circumstances, only two binary digits are required for command and position information.

| Command | | | | | | Position | | | | |
|---|---|---|---|---|---|---|---|---|---|---|
| 5 | 4 | 3 | 2 | 1 | | 5 | 4 | 3 | 2 | 1 |
| 0 | 0 | 0 | 0 | 0 | 0 | 0 | 0 | 0 | 0 | 0 |
| 0 | 0 | 0 | 0 | 1 | 1 | 0 | 0 | 0 | 0 | 0 |
| 0 | 0 | 0 | 1 | 0 | 2 | 0 | 0 | 0 | 0 | 0 |
| 0 | 0 | 0 | 1 | 1 | 3 | 0 | 0 | 0 | 0 | 1 |
| 0 | 0 | 1 | 0 | 0 | 4 | 0 | 0 | 0 | 1 | 0 |
| 0 | 0 | 1 | 0 | 1 | 5 | 0 | 0 | 0 | 1 | 1 |
| 0 | 0 | 1 | 1 | 0 | 6 | 0 | 0 | 1 | 0 | 0 |
| 0 | 0 | 1 | 1 | 1 | 7 | 0 | 0 | 1 | 0 | 1 |
| 0 | 1 | 0 | 0 | 0 | 8 | 0 | 0 | 1 | 1 | 0 |
| 0 | 1 | 0 | 0 | 1 | 9 | 0 | 0 | 1 | 1 | 1 |
| 0 | 1 | 0 | 1 | 0 | 10 | 0 | 1 | 0 | 0 | 0 |
| 0 | 1 | 0 | 1 | 1 | 11 | 0 | 1 | 0 | 0 | 1 |
| 0 | 1 | 1 | 0 | 0 | 12 | 0 | 1 | 0 | 1 | 0 |
| 0 | 1 | 1 | 0 | 1 | 13 | 0 | 1 | 0 | 1 | 1 |
| 0 | 1 | 1 | 1 | 0 | 14 | 0 | 1 | 1 | 0 | 0 |
| 0 | 1 | 1 | 1 | 1 | 15 | 0 | 1 | 1 | 0 | 1 |
| 1 | 0 | 0 | 0 | 0 | 16 | 0 | 1 | 1 | 1 | 0 |
| 1 | 0 | 0 | 0 | 1 | 17 | 0 | 1 | 1 | 1 | 1 |

It will be noted, however, that at the four and five, eight and nine, twelve and thirteen and seventeen decimal digit number positions of the left-hand column of figures, that the command information has a lesser value than the position information which is opposite to the condition existing in the number positions, 0 through 3, 6 and 7, 10 and 11, and 14 and 15. Therefore, in the specific system described above, although the absolute difference between the numbers is always the same, the algebraic sign of the difference reverses each two number positions and if such a situation were allowed to persist, the control motor would merely oscillate about the first point of reversal encountered thereby rendering the mechanism useless.

In accordance with the present invention, the above-described difficulty can be eliminated by carrying just one extra binary digit in both the command and position information channels. Considering now the first three right-hand columns of both sets of binary members, decimal number 17 positions that an arrangement of the two highest order digits in both the command and position registers exist which is unique to those positions. Specifically, in the 4 and 5, 12 and 13 number positions, in the command register, the second and third order digits, respectively, are 0 and 1, while the corresponding numbers in the position register are 1 and 0. This combination in numbers exists only at these positions. On the other hand, at the 8 and 9 and 16 and 17 positions, the second and third order digits of the command of register are 00 while the corresponding digits in the position register are 1 and 1, respectively. Therefore, since these combinations of the two highest ordered are unique to positions of ambiguity, and this is true regardless of the number of digits employed, by utilizing these two highest order digits to control a further voltage generating network, reversal of the polarity of error signal may be prevented and ambiguities arising therefrom, may be eliminated. Specifically, if upon sensing the unique conditions described above, a circuit is provided for adding to the voltage produced by the converter having a magnitude indicative of a binary number equal to one greater than the capacity of the digits of the binary number exclusive of the highest order digit, the correct difference voltage will be obtained between the command and position numbers. In the illustration being employed, if a binary voltage representative of a binary 8 is added to the network for subtracting the position number from the command number, a reversal of polarity of the error signal does not take place and a voltage indicative of the true difference between the two numbers is produced. Referring now to the horizontal row of the decimal three number, the command number is three and the position number is 1. Upon subtraction of the position number from the command number, a voltage is produced which is indicative of a positive difference having a magnitude of two. However, in the decimal 4 and 5 positions, when the two digit position number is subtracted from the two digit command number, the difference is —2. If now a positive voltage indicative of a binary 4 is added to the network, then the error voltage remains positive, since the negative 2 resulting from subtracting the position number from the command number is then subtracted from the +4 and produced a +2 which is the correct number.

It must be stressed that the highest order digit is not carried as a part of the position or command number, as such, but is employed only for the purpose of preventing ambiguity arising when one of the registers (either the command register or the position register) overflows before the other one does. This may be readily brought out upon further reference to the table of binary numbers by considering the third order number as a part of the command and position numbers. It will be seen that if this number is considered only as a part of the binary number, then in the decimal numbers 8, 9 and 16, 17 positions, the same difficulty arises as arose with respect to the 4, 5 and 12, 13 positions in addition to the 8, 9 and 16, 17 positions. Thus, if the highest order number is considered merely as a part of the overall binary number, then this ambiguity appears at one or more points in the system unless the entire number is carried. Only by employing the highest digit as a marker digit, that is, as a digit employed only for the purposes of eliminating the ambiguity, can this problem be solved.

As previously indicated, the value of each binary number indicates a particular distance of displacement from a given reference point with the binary number zero indicating when the mechanism is at or a command is given indicating that the mechanism should be at the reference or zero location. In the example given above, with the command numbers assumed to be in the left-hand column and the position numbers in the right-hand column, the apparatus is moving away from the reference position, but obviously the converse may be true and the apparatus may have, during the course of its operation, been directed to proceed to a position remote from the reference position and thereafter be directed to proceed back toward the reference position. The discussion given above concerning ambiguity and the method of the present invention for eliminating ambiguity when the entire binary command and position numbers are not utilized, applies equally well to both movement away from and toward the reference position. In the latter case, that is, when movement is toward the reference position, the position numbers are greater than the command numbers since the apparatus is always lagging behind the command numbers. In the latter case, the right-hand column would now indicate the command numbers and the left-hand column of binary numbers indicate the position numbers. It will be noted that in this instant, the positions of ambiguity now are the numbers in the locations, 2, 3, 6, 7, 10, 11 and 14 and 15. It will also be noted that in these positions, the arrangement of the numbers in the two highest order columns, are again unique, that is, distinct from the numbers in any other position and therefore, the same system of detecting these unique conditions may be employed as was employed for detecting ambiguities arising during the opposite direction of movement. Thus, regardless of the direction of movement of the apparatus, either toward or away from a reference position, all ambiguities produced by the system as a result of utilizing less than the total number of binary digits required to express a definitive position of the apparatus may be overcome by the utilization of one of the highest order binary digits as an indicator digit rather than as a number digit.

In considering the apparatus of the invention, certain facts immediately become apparent. The invention has no utility unless the maximum number which may be represented by the binary digits actually employed is less than half the total number. If the maximum number which may be represented is greater than half of the maximum possible number, then the addition of the one marker digit covers the entire range since, as is well known, when one extra digit is added to a binary number, the maximum number which may be represented is multiplied by two. Also, and this has been indicated above, the number which is represented by the binary digits actually employed to designate positions, must be greater than the number lag between the command and position numbers since if this is not true, the position number may fall behind the command number by a number encompassing two positions of ambiguity. The apparatus is not designed to handle such a situation, since the apparatus can only overcome an ambiguity indicative of a displacement over one area of ambiguity.

In addition to the underlying concept which permits accurate control of a machine in spite of a fact that only a small portion of the command and position numbers are utilized, the present invention contemplates a novel circuit for sensing the areas of ambiguity thus produced and for producing an addition voltage of the proper polarity and magnitude for preventing undesired reversal of the polarity of the error voltage which would produce oscillation of the system.

It is, therefore, an object of the present invention to provide a digital servomechanism utilizing coded pulses for indicating command and position information wherein the quantity of information which must be handled can be materially reduced by utilizing digits of the command and position numbers as marker digits rather than digits which form a part of the numerical command or position number.

It is another object of the present invention to provide a circuit for determining the difference between two digital numbers and to produce an analogue voltage having a magnitude and polarity indicative of the difference between these two numbers; which circuit further includes elements for producing an additional analogue voltage in response to certain relative conditions of predetermined digits of the two numbers to produce a voltage which prevents an undesired reversal of the analogue voltage thus produced.

The above and still further objects, features and advantages of the present invention will become apparent upon consideration of the following detailed description of one specific embodiment thereof, especially when taken in conjunction with the accompanying drawings, wherein.

Figure 1:
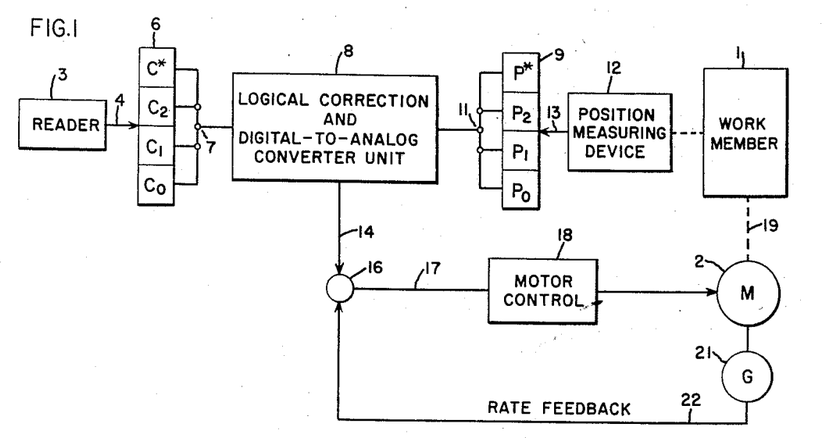
Figure 1 of the accompanying drawings is a schematic block diagram of a machine tool control system which may utilize the apparatus and circuit of the present invention.

Referring specifically to Figure 1 of the accompanying drawings, a work member, which is generally designated by the reference numeral 1, is to have its position controlled by a motor 2 in accordance with command instructions produced by a reading mechanism 3 adapted to sense information from physical storage members. The work member 1 may be taken to represent an element of a machine tool which must be controlled in order to control the dimensions of a workpiece and may constitute the bed of a planer, the tool holder of a lathe, the drill of a drill press, etc. The reader 3 may constitute a magnetic tape reader, a punch tape reader, a punch card reader, a film reader, etc.; the specific type of storage member obviously determining the type of reading mechanism 3 employed. The reading mechanism 3 is as previously indicated adapted to interrogate the various storage areas, either in parallel or in series, of a storage member and to convert the information represented in physical form on the storage member into voltage pulses on a line 4 which are supplied to a command storage register 6 constituting a plurality of stages $C_1$, $C_2$, $C_3$ and $C^*$. The information supplied to the register 6 from the reader 3 may constitute a number, in coded form, which indicates a unique position of the work member 1 within one digital block from a distinct reference position which is the beginning of the digital block. A digital block consists of a number of binary bits sufficient to cause the register to reset to zero from the highest number it can reach depending upon the number of digits it contains. The form of the number supplied to the register 6 depends upon the form of code employed and the present invention is described as utilizing a cyclic binary code although it is not intended to limit the invention to utilization of a precise code, since other well-known codes, such as binary coded decimal, may be utilized in a cyclic form. Assuming, however, that a cyclic binary code is utilized, then each stage of the register 6 stores a digit, of a different order of the binary number, the composite of the information stored being the number stored on the storage unit as determined by the reader 3. The register must be utilized to store the information as determined by the reader 3 where punched tapes or cards are employed. The voltages produced by reading such members are discontinuous and in order to produce a continuous indication, a storage member, the shift register 6, must be employed. It is obvious that if the storage member is a tape or film having continuous recordings of the various binary digits, the physical storage medium is the only storage medium required and the register 6 may be eliminated.

The information stored in the register 6 is fed via a plurality of leads 7, one for each stage of the register 6 to a logical correction and digital to analogue conversion unit 8 which compares the command number; that is, the number stored in the register 6 with a binary number stored in a position register 9 and fed to the unit 8 via a plurality of leads 11. The binary number stored in the register 9 indicates the actual position of the work member 1 with respect to the reference position, so that the difference between the command number in the command register 6 and the position information in the position register 9 indicates the displacement of the work member 1 from a desired position. The displacement of the work member 1 from a desired position is represented by error signal which, in voltage form, is employed to control the work member so as to tend to reduce this difference.

The information appearing in the position register 9 is generated by a position measuring device 12 and supplied to the register 9 via a lead or plurality of leads 13.

The position measuring device is either physically, optically or electrically coupled to the work member 1 so that at all times the information generated by the position measuring device 12 and stored in the position register 9 is indicative of a precise position, within the limits of accuracy of the system, of the work member 1. Mechanisms 12 for generating the position information are well known in the art and may take the form of an optical disc having a plurality of concentric circles each of which is divided into a plurality of opaque and transparent arcs, the size and spacing between the arcs in each of the circles being determined by the order of the binary digit to be generated by the passage of light through the particular concentric circle. A similar effect or system, which is also well known in the art, comprises a plurality of brushes disposed to engage appropriate tracks of a record member, the tracks being defined by alternate segments of conductive and non-conductive material.

The digital information applied to the correction and digital to analogue conversion unit 8 is in the form of a cyclic binary code which is converted into an analogue voltage having a magnitude and polarity determined by the relative magnitudes of the binary number stored in the registers 6 and 9. This difference voltage which constitutes the error voltage of the system appears on an output lead 14 and is fed via a combining network 16 and a lead 17 to a motor control circuit 18. The motor control circuit 18 controls the direction and speed of rotation of the motor 2 which is coupled to drive the work member 1, via a mechanical coupling 19, in a direction to attempt to make the number generated by the position measuring device 12 correspond more closely with the command number stored in the register 6. As an added feature the motor 2 may drive a tachometer generator 21 which feeds back a rate signal, via a lead 22, to the combining network 16 so that the error voltage appearing on the lead 17 is decreased by a rate factor such that as the speed of the motor 2 increases, the voltage on the leads 17 is decreased. As the motor 2 approaches a correct position, the position error signal 14 reduces and thus the motor is slowed down as the final position is approached.

As previously indicated, the size of the binary number which is normally registered in digital servo systems in order to obtain a predetermined accuracy over a predetermined allowable displacement, is quite large and if the displacement of the work member is taken to be 24″ and the accuracy of the system is to be $\frac{1}{1000}$ of an inch, fifteen binary digits must be employed for the command number and fifteen digits for the position number in order to achieve the desired accuracy. Each binary number which may be represented by the fifteen binary digits indicates a discrete distance of the work member from a reference position. Since the accuracy is to be $\frac{1}{1000}$ of an inch, there must be a distinct binary digit for each $\frac{1}{1000}$ of an inch displacement from the reference, where the workpiece is 24″ long, there are 24,000 discrete positions including the reference or 0 position. It is apparent that where possible, the number of binary digits which must be utilized should be reduced, since if a fifteen binary digit word is employed, the physical storage unit read by the reader 3 must contain fifteen discrete positions per command number, the reader 3 must be capable of reading fifteen locations, the register 6 must be capable of storing fifteen digits, the position measuring device 12 must be capable of generating fifteen digit words and the unit 8 must be capable of converting two words of fifteen binary digits each to analogue error signal.

In accordance with the present invention, the requirement of storage of words of such size is eliminated and the size of the word which must be handled by the equipment is determined wholly by the expected lag between the actual position of the work member and the command position. Thus, if it is assumed as it is in the apparatus here described for purposes of illustrating the present invention and the discussion relating thereto that the work member at no time lags behind the command position by more than two-one-thousandths of an inch, that is, by two successive command numbers, the binary information which must be stored in the system need only constitute sufficient digits to include the binary number 2. Manifestly, this would require only two binary digits per number. However, as a margin of safety the apparatus of the present invention, and reference is now made to Figure 2 of the accompanying drawings, utilizes three binary digits per command and position number.

Figure 2:
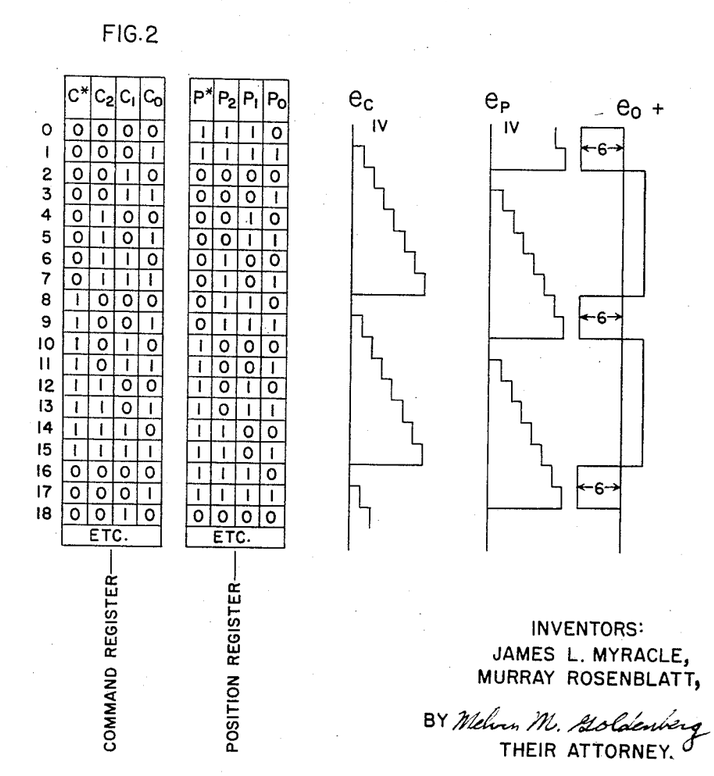
Figures 2 and 3 are mathematical table and a voltage diagram indicating the magnitudes of the voltages indicative of the numbers represented in the mathematical table, further indicating the voltage difference between these voltages.

In Figure 2 of the accompanying drawings, the left-hand table of numbers represents a progression of numbers in the command register 6, the other table of numbers represents the numbers in the position register 9, which correspond to the command numbers in the same horizontal row, taking into consideration a position lag of two numbers, the left-hand column of stair step waves represent the analogue voltages representing the command numbers, the other stair step waves represent the analogue voltages corresponding to the numbers in the position register and the right-hand voltage wave represents the voltage difference between the two stair step voltage waves. This figure represents a condition when the work member is being moved away from the reference position. The binary numbers represented by the digits in the columns $C_0$, $C_1$ and $C_2$ of the left-hand table each represents a desired position of the work member and the digit in the $C^*$ column forming a continuation of the cyclic code in the other stages of the register is not employed to represent a position to prevent ambiguity due to repetition of the cyclic code within the $C_0$, $C_1$ and $C_2$ and $C^*$ stages of the register. Likewise, with regard to the binary numbers in the position register, the digits in $P_0$, $P_1$ and $P_2$ and $P^*$ stage of the register represent the actual position of the work member and although the $P^*$ number digit forms a part of the cyclic binary code, it does not, therefore, form a part of the number designating position, but is viewed along with the $C^*$, the $C_2$ and $P_2$ digits in order to prevent ambiguities.

The analogue voltages represented by the command and position register numbers are indicated by the vertically stepped voltage diagrams $E_c$, $E_p$, respectively, while the $E_o$ graph represents the analogue voltage having a magnitude and polarity indicative of the difference between the voltages $E_c$ and $E_p$. It is assumed that the work table is moving away from its zero reference position and therefore the numbers in the command and position registers are increasing downwardly with the number in the position register lagging behind the corresponding numbers in the command register. It is also assumed that when the apparatus is moving away from the zero position, the polarity voltage required to effect correct direction of movement of the motor is negative.

Referring now to the voltage graphs representing the voltages $E_c$ and $E_p$, it will be noted that the stepped wave forms are repetitious with the number of steps in each wave form being determined by the maximum number which may be represented by the digits stored in the registers exclusive of the highest order digit. Where, as in the example employed, the binary numbers are three digit numbers, the maximum value of the binary number is 7 and its minimum value is, of course, zero. Thus, the number in the register builds up to a maximum of 7 and then returns to zero and in consequence, each number represents a definite position within a given range or block of positions but does not indicate a definitive position with respect to the entire distance of travel of the work member 1. At those locations where the command number becomes less than the position number due to the transition of the command number from a maximum number of one series or block of numbers to the minimum number of the next succeeding set or block of numbers, then ambiguity arises and if nothing further were provided, the machine would oscillate between four command number positions which is all that is required to cause the polarity of voltage to reverse taking into account the lag of the system.

This effect can readily be seen by reference to the three voltage diagrams $E_c$, $E_p$ and $E_o$. So long as the voltage $E_c$ is greater than the voltage $E_p$, the difference is positive, but when the voltage $E_c$ falls from a value of 7 to a value of 0 and the voltage $E_p$ is equivalent to a 6, the difference between the position and command voltages is −6 rather than +2. In order to overcome this ambiguity or reversal voltage, the additional digit C* is provided in each of the command and position registers and these digits are utilized in conjunction with the digits in the $C_2$ and $P_2$ positions to add a voltage equivalent to a positive binary 8 to the conversion network so that the −6 being subtracted from the positive 8 produces a voltage of +2 which is the voltage produced during the remainder of the operation of the system.

Figure 3:
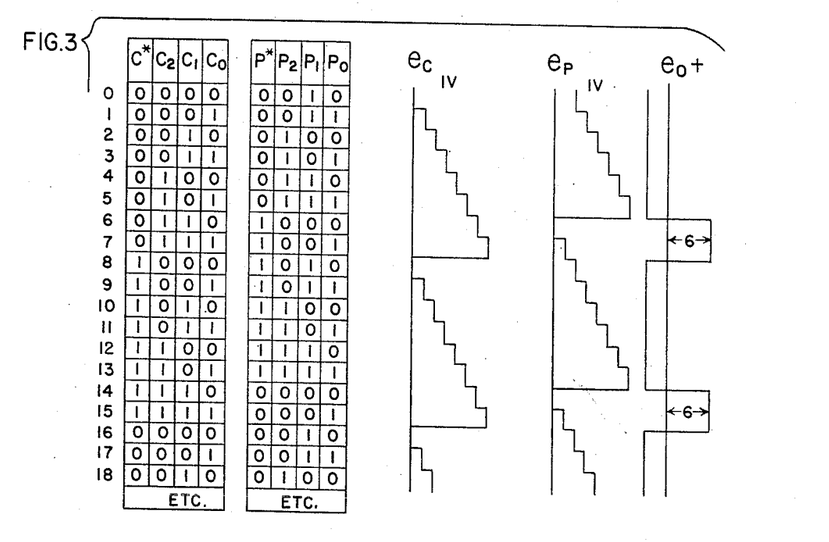

This system must operate regardless of whether the work table is moving away from or toward the reference position and reference is now made to Figure 3 of the accompanying drawing to illustrate the operation of the system when the latter case arises, that is, when the table is moving toward the reference position. In this case, the numbers are diminishing and therefore the command number is read from the bottom of the table toward the top and also since the position register lags behind the command register, the number in the position register is always greater than the number in the command register. Since the number in the position register is greater than the number in the command register, the error signal is normally negative and when the number in the command register becomes greater than the number in the position register, a positive signal having a magnitude indicative of a binary 6 is produced. In order to preclude the possibility of the production of the positive signal, the C*, P*, $C_2$ and $P_2$ positions are sensed to add, in this case, a voltage indicative of a −8 to the voltage so that the +6 upon being subtracted from the −8 voltage produces a voltage of −2 which is the correct value for the system.

Figure 4:
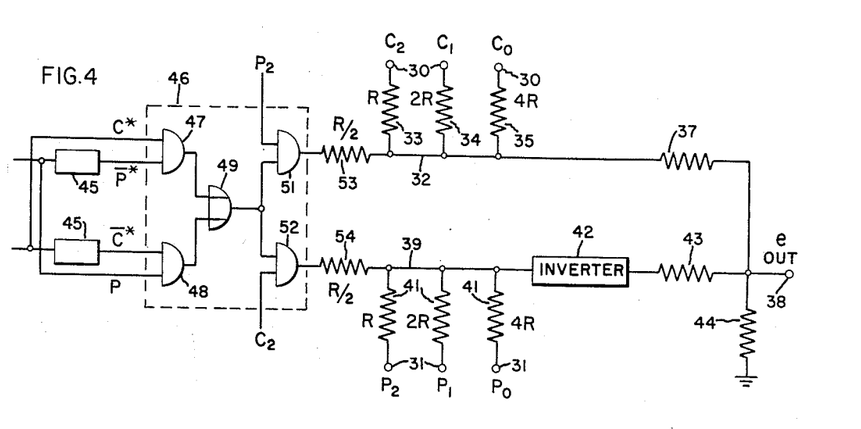
Figure 4 is a schematic wiring diagram of a logical correction network and digital to analogue converter which may be employed in the apparatus of the present invention.

Reference is now made to Figure 4 of the accompanying drawings for a detailed circuit diagram of one embodiment of a logical correction and conversion network, which may be utilized in the present invention. In this network each stage of the command register 6 of Figure 1 is connected to a distinct input terminal 30, each of which is labeled with the stage of the command register from which it is to receive information. Similarly, a second set of terminals 31 is provided, each terminal of which is labeled with the stage of the position register 9 of Figure 1 from which it is to receive information. The $C_2$ terminal 30 is connected to a bus 32 through a resistor 33 having a value of R while the $C_1$ and $C_2$ terminals 30 are connected to the bus 32 through resistors 34 and 36 having values 2R and 4R. This arrangement is conventional in digital to analogue converters and is based upon the fact that each binary digit has a weight equal to twice that of the next succeeding lower order digit and therefore if the same voltage is applied to all of the terminals 30, then the voltage appearing on the bus 32 is a summation of weighted voltages representative of each of the binary digits representing a binary 1. Specifically, a voltage applied to the terminal $C_2$ will be diminished by a value R while a voltage applied to the terminal $C_1$ is diminished by a value of 2R and therefore is equal to only half of the voltage applied through the resistance having a value R.

The voltages appearing on the bus 32 from each of the terminals $C_0$, $C_1$ and $C_2$ are summed in a summing resistor 37 and are applied to an output terminal 38 labeled $E_{out}$. The terminals $P_0$, $P_1$ and $P_2$ are connected to a bus 39 through resistors 41 having values 4R, 2R and R, respectively, this arrangement being the same as that with respect to the command register conversion section.

The voltages applied to the bus 39 are summed in a resistor 43 and thus voltages appear on the buses 32 and 39 having magnitude determined by the binary numbers stored in their respective registers 6 and 9. If positive voltages are applied to the terminals 30 and 31, then the voltages appearing on the leads 32 and 39 would be summed rather than subtracted. Therefore, the bus 39 feeds through an inverter 42 to the resistor 43 negative voltage of the same magnitude as the voltage appearing on the bus 39 is developed across the resistor 43. The two voltages are subtracted across a resistor 44 connected to a source of reference potential such as ground, so that the voltage appearing at the output terminal 38 has a magnitude determined by the relative magnitude of the binary numbers in the registers 6 and 9 and a polarity determined by which of the numbers has a higher value. If the number in the command register is larger, the voltage at the terminal 38 is positive whereas if the number in the position register 9 is larger, the voltage at the terminal 38 is negative.

Other than in those areas where an ambiguity occurs, the absolute magnitude of the voltage at the terminal 38 is equivalent in the system described to a binary 2 and this is also true in areas of ambiguity, as a result of the utilization of a logical correction network enclosed within the dashed lines and generally designated by the reference numeral 46. In one embodiment of the present invention, the logical correction network 46 constitutes a first two-input And-gate 47 and a second two-input And-gate 48 feeding in common an Or-gate 49 the output voltage from which is applied to one input of a third And-gate 51 and one input of a fourth And-gate 52. The input voltages to the And-gate 47 are derived from the C* stage of the command register 6 and from the P* stage of the position register. The polarity of the voltage from the P* stage applied to gate 47 is reversed and is designated as $\bar{P}^*$, the horizontal line or "bar" indicating reversal of polarity. In consequence of the reversal of polarity, when the P* stage contains a binary zero, the voltage applied to the And-gate 47, is positive, whereas when a binary 1 is stored in this stage, the voltage applied to the And-gate 47 is zero. The phase reversal may be effected by passing the voltage output from the register through inverters 45. The input leads to the gate 48 are connected to the P* stage of the position register and connected through an inverter to the C* stage of the command register. The And-gate 51 is connected to receive, in addition to the output from the Or-gate 49, the voltage at the $P_2$ stage of the position register and the other input lead to the And-gate 52 is connected to the $C_2$ stage of the command register 6.

Referring now to Figure 2 at the regions of ambiguity, which occur in the graphs at rows designated by decimal numbers 0, 1, 8, 9, 16 and 17, only two binary ones are present in the C*, P*, $C_2$ and $P_2$ positions and the C* and P* and $P_2$ and $C_2$ digits are different. For instance, when the position register registers binary 16 and 17, the $P_2$ and the P* stages contain ones and the $C_2$ and C* stages contain zeros. At this time and referring now to Figure 4, the $\bar{C}^*$ lead to the gate 48 is positive, the P* lead to this gate is positive and a voltage is passed through the Or-gate 49 to one input of the And-gates 51 and 52. Since the $P_2$ voltage is positive and the $C_2$ voltage is negative, a voltage is passed only through the gate 51 and through a resistor 53, having a value of one-half R, to the bus 32. Since the value of resistor 53 is one-half R, the voltage applied to the bus 32 from the gate 51 is twice that applied from the $C_2$ stage of the command register to the bus, and the voltage applied through resistor 53 is therefore equal to the representative of a binary 8. Since in this position the voltage at the output of the terminal 38 would if the correction network were not employed, be −6, the addition of the voltage representative of a binary 8 produces a voltage representative of a binary 2 at the output. Another condition of binary numbers which may arise in the $P_2$, $P^*$ and $C_2$ and $C^*$ stages is when the value in the position register 6 or 7 at which time the value in the C register is 8 or 9. In this case, the $C^*$ stage has stored a binary 1, the $P_2$ stage stores a one and the other stages of interest store zeros. Returning again to Figure 4, when the $C^*$ stage has a 1 and the $P^*$ stage stores a zero so that $\bar{P}^*$ voltage is positive, a voltage again is applied through And-gate 48 and through the Or-gate 49 to one input of each of the gates 51 and 52. At this position, the $P_2$ stage of the position register is positive and voltage again is applied through the gate 51 and resistor 53 to the bus 32. Under no other conditions of the registers is a combination of the digits in the significant stage of the registers such that information can be gated through the gates 51 and 52.

Referring now to the conditions of operation when the member 1 is being moved toward the reference position and referring specifically to Figures 3 and 4 of the accompanying drawings, ambiguities would normally arise when the command registers have stored therein binary 6, 7, 14 and 15. At the times that the command register stores a binary 6 or 7, the $P^*$ stage stores a binary 1, the $C_2$ stage stores a binary 1 and the other significant stages store binary 0. Under this condition, the $P^*$ and $\bar{C}^*$ input leads to the gate 48 are energized and energize one input lead of the gates 51 and 52 through the Or-gate 49 and the $C_2$ lead to the gate 52 is energized so that a voltage is applied through a resistor 54 to the lead 39. The resistor 54 has a value of R/2 so that a voltage indicative of a binary 8 is added to the bus 39 and upon passing through inverter 43 adds a voltage representative of a −8 to the voltages across the resistor 44 so that the voltage at the output terminal 38 assumes a value of −2 rather than +6. Similarly, under those conditions when the command register contains numbers equal to binary 14 or 15, the $C^*$ and $\bar{P}^*$ leads to the gate 47 are energized and the gate 52 is again open to apply a voltage to the bus 39. Thus, regardless of the direction of movement of the work member 1 and the limited storage of the command and position registers 6 and 9, the system of the present invention may accurately control the position of a machine member or any other variable position member.

Figure 5:
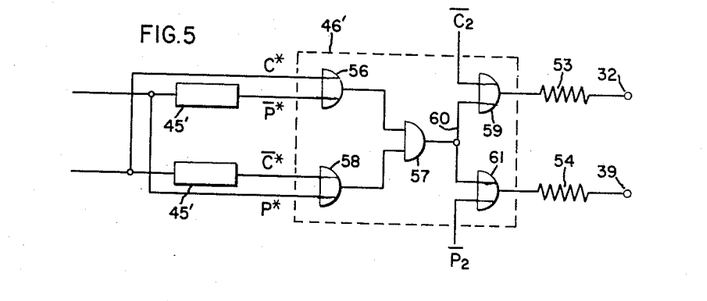
Figure 5 is a schematic circuit diagram of another form of the logical correction network which may be employed in the apparatus of the invention.

In the embodiment of the logical correction network 46 illustrated in Figure 4 of the accompanying drawings, correction voltages are applied to one of the buses at those times when a region of ambiguity is encountered in the working range of the binary numbers. In an alternative embodiment illustrated in Figure 5 of the accompanying drawings, correction voltages are applied to both buses 32 and 39 at all times except when an ambiguity is detected at which time the correction voltage is removed from one of the buses but remains on the other of the buses. Referring now specifically to Figure 5, the logical correction network is enclosed within dashed lines and designated by the reference numeral 46'. The unit 46' comprises a first Or-gate 56 having its output lead connected to a first input of an And-gate 57 and further comprises a second Or-gate 58 having its output lead connected to the second input lead to the And-gate 57. An output lead from the And-gate 57 is connected via an output lead 60 to a first input lead to each of the Or-gates 59 and 61. An output lead from the Or-gate 59 is connected via resistor 53 to the bus 32 and an output lead of the Or-gate 61 is connected via resistor 54 to the bus 39. The input leads to the Or-gate 56 are designated $C^*$ and $\bar{P}^*$ and are connected respectively to the $C^*$ stage of the command register 6 and through an inverter 45' to the $P^*$ stage of the position register 9. The Or-gate 58 has two input leads designated by the references $\bar{C}^*$ and $P^*$ which are connected through an inverter 45' to the $C^*$ stage of the command register to the $P^*$ stage of the position register, respectively. The Or-gate 59 has a second input lead designated $\bar{C}_2$ connected through an inverter to the $C_2$ stage of the command register 6 and the Or-gate 61 has a second input lead designated $\bar{P}_2$ connected to the $P_2$ stage of the position register 9 through an inverter.

Reference is now made to Figures 2 and 5 of the accompanying drawings and it can be seen that in the third and fourth positions down from the top of the command and position registers, the $C_2$ and $P_2$ stages are zeros and therefore both the Or-gates 59 and 61 have one input lead positive and a voltage is applied through the resistors 53 and 54, respectively, to the buses 32 and 39. In the fifth through eighth rows of the command and position register tables in Figure 2, the $C^*$ and $P^*$ stages contain zeros and therefore voltage is passed through both Or-gates 56 and 58 to open the And-gate 57 which passes a voltage through gates 59 and 61 to the buses 32 and 39. It will be noted, however, that in the first and second rows of the register tables in Figure 4, the $C_2$ stage of the command register contains zeros and therefore the gate 59 passes a voltage but the $P_2$ stage of the position register has a binary 1 and no positive voltage is applied to the Or-gate 56 and therefore no voltage is applied through the Or-gate 61 to the bus 39. Thus, at this point of ambiguity only the bus 32 is provided with a compensating voltage. In the ninth and tenth rows of the tables of Figure 2, the $\bar{C}_2$ bus to the gate 59 is again energized because of the zeros in the $C_2$ register, but since the $P_2$ stage stores binary ones and the Or-gate 58 is not energized the Or-gate 61 is blocked and no voltage is applied to the bus 39. A similar analysis can be applied to the system when using the tables and graphs of Figure 3 and it will be seen that the bus 39 is the only one energized during intervals of ambiguity whereas at all other times both buses are energized. Thus, it is seen that the system of correction may take various forms, and is not limited to a specific gating system or the utilization of a specific correction voltage or set of correction voltages.

Figure 6:
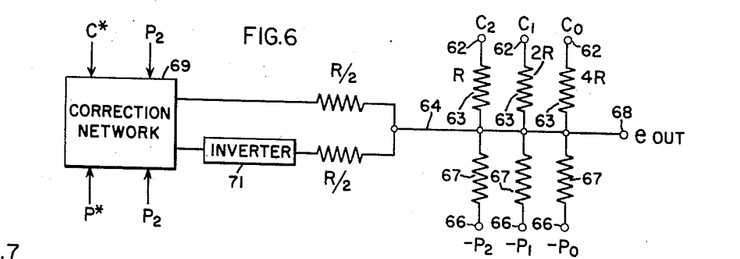
Figure 6 is a schematic wiring diagram of another embodiment of an analogue to digital converter which may be employed in the apparatus of the invention.

The analogue to digital conversion network illustrated in Figure 4 is not intended to be the only type which may be utilized in the present invention and reference is now made to Figure 6 wherein a different form of digital to analogue conversion system is illustrated. In this system the stages $C_0$, $C_1$ and $C_2$ of the command register 6 are connected to terminals 62 of the converter, each of the terminals 62 being connected through distinct resistors 63 to a bus 64. The values of the resistors 63 are again weighted so that the voltage applied by the command register 6 through the terminals $C_1$ to the bus 64 is half that applied via the terminal $C_2$ and twice that applied via the terminal $C_0$. The stages of the position register are connected to terminals 66 and via resistors 67 to the voltage bus 64. The resistors 67 are appropriately weighted and the bus 64 is connected to an output terminal 68. The terminals 66 are connected to receive negative voltages from the position register 9. It will be remembered that in the circuits of Figure 4, positive voltages were applied to the converter from both the command and storage registers and therefore voltages had to be independently summed and one of the voltages inverted so that subtraction occurred. In the circuit of Figure 6, the voltages applied from the command register are positive while the voltages applied from the position register are negative and therefore direct summation of the voltages is possible since the voltages are of opposite polarity and subtract directly. The correction network 69 utilized with the converter of Figure 6 may be of either of the types illustrated in Figure 4 and Figure 5 and the only variation in the network is that the $\bar{P}^*$ leads now become $P^*$ and the $P^*$ leads become the $\bar{P}^*$ leads, since the negative voltage is now the normal voltage with respect to the P register and the positive voltage is the inverted voltage. One other alteration must be made in the circuit as a result of the fact that a single voltage bus 64 is employed rather than the two voltage buses 32 and 39 of Figure 4. Specifically, since the inverter is eliminated and the correction network 69 can gate only positive voltages, an inverter 71 must be inserted in the negative correction output lead of the correction network 69. With inverter 71 in the correction network output lead the voltage developed on the lower output lead of the circuit 69 is negative while the voltage on the upper lead is positive.

Figure 7:
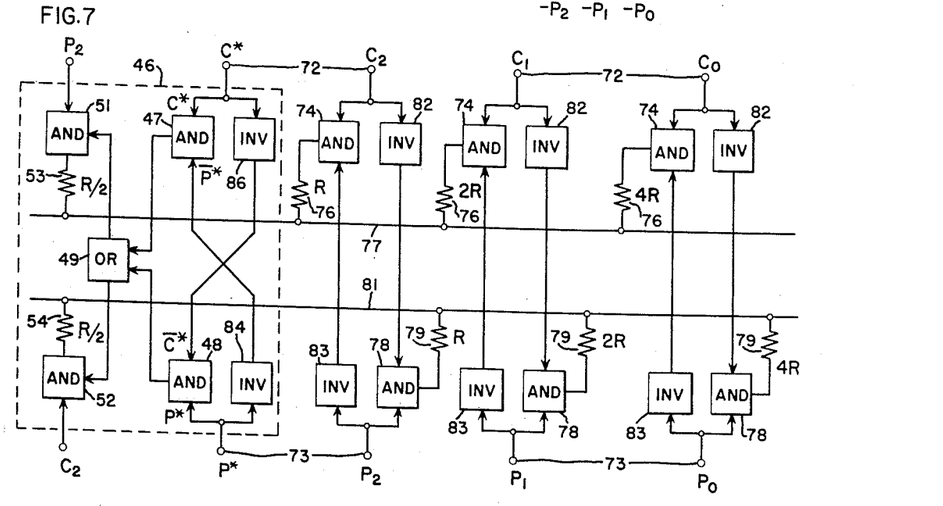
Figure 7 is a schematic wiring diagram of a still further embodiment of a correction network and analogue to digital converter which may be employed in the present invention.

The digital to analogue circuits thus far described have totalized all of the voltages representing binary ones from both registers. Such systems are subject to error in consequence of changes in the values of the weighted resistors and changes of the values in the voltages received from the registers due to variations in tube characteristics and the plate voltage supplies. Where extreme accuracy is required, and it is not obtainable due to uncontrollable variations in the various voltage and circuit parameters, the digital to analogue converter circuit illustrated in Figure 7 may be employed. The purpose of this circuit is to eliminate from the voltage summations those voltages representing digits from the two registers of the same order and same instantaneous value so that only those voltages are added and subtracted which represent digit values not having a corresponding value in the other register. Referring specifically to Figure 7, the $C_0$, $C_1$ and $C_2$ and $C^*$ stages of the command register are connected to input terminals 72 of the converter and the $P_0$, $P_1$, $P_2$ and $P^*$ stages of the register 9 are connected to input terminals 73. Each of the $C_0$, $C_1$ and $C_2$ terminals is connected through a distinct And-gate 74 to one end of a distinct resistor 76 the other end of which is connected to a voltage bus 77. The value of the resistor 76 connected between the $C_1$ terminal 72 and the bus 77 has a value twice as large as the corresponding resistor 76 connected between the $C_2$ terminal and the bus 77 and half as large as the resistor connected between the $C_0$ terminal 72 and the bus 77. Therefore, the arrangement of the relative values of said resistors 76 correspond to the relative values of the resistors 33 in Figure 4 and serve the same function. Each of the $P_0$, $P_1$ and $P_2$ terminals 73 is connected through a different And-gate 78 to one end of a resistor 79, the other end of which is connected to a voltage bus 81, the resistors 79 corresponding to the weighted values of the resistors 76. Each of the And-gates 74 and 78 have two input gates and the second input of each of the gates 78 is fed from a different one of the $C_0$, $C_1$ and $C_2$ terminals 72 through a distinct inverter 82. The $C_0$ terminal 72 is connected through an inverter 82 to a second input of the And-gate 78 having its other input lead connected to $P_0$ terminals 73. Each of the And-gates 78 in the $P_1$ and $P_2$ positions is connected to receive output from inverter 82 fed from the $C_1$ and $C_2$ terminals, respectively. The second input to each of the And-gates 74 is connected to an output terminal of an inverter 83 each of which is connected to be energized from a distinct one of the terminals 73, the And-gates 74 in the $C_0$, $C_1$ and $C_2$ positions being fed from inverters connected to receive input voltages from the terminals 73 in the $P_0$, $P_1$ and $P_2$ positions, respectively. The logical correction network illustrated in Figure 7 is identical with the network illustrated in Figure 4 and therefore is generally designated by the reference numeral 46 which is also employed in Figure 4. The only difference between the illustration of the logical correction network 46 in Figures 4 and 7 is that in Figure 7 the inverter for producing the $\bar{P}^*$ voltage is illustrated as inverter 84 and the inverter for producing the $\bar{C}^*$ voltage is illustrated as inverter 86. All other elements of the logical correction network 46 carry the same reference numerals as the corresponding elements in Figure 4 and the operation is not described since the operation is the same in both instances.

Proceeding now with the detailed description of the operation of the digital to analogue converter of Figure 7, if both the $P_2$ and $C_2$ stages of the position and command registers respectively are storing binary ones no output is produced from either of the And-gates 74 and 78 since the $C_2$ voltage upon proceeding through the inverter 82 de-energizes the one input lead to the gate 78 and the $P_2$ voltage, inverted by the inverter 83, provides a negative or zero voltage at one of the input leads to the And-gates 74 and blocks the gate. If a positive voltage is applied to the $P_2$ terminal 73, but not to the $C_2$ terminal 72, then the gate 78 in the $P_2$ position is opened, since the zero or negative voltage at $C_2$ is inverted to provide a positive voltage on the one input lead to the And-gate 78, the $P_2$ voltage providing the other positive voltage required to open the gate. Conversely, if a positive voltage is applied to $C_2$ terminal 72, but not to $P_2$ terminal 73, then the gate 74 in the $C_2$ position is open and a weighted positive voltage is applied to the bus 77. Thus, the analogue voltages on the buses 77 and 81 are composed of discrete voltage values which do not have corresponding values in the other register or on the other bus and errors in the output voltage are reduced since only a small number of voltages are utilized and the probability and extent of error is greatly reduced.

It should be noted that the type of circuit utilized in Figure 7, that is, the utilization of gates and inverters to produce summation of only those voltages which do not have corresponding voltages in the other register, may be applied to the type of circuits illustrated in the Figure 6.

The specific circuits illustrated in the figures of this application indicate preferred circuits for performing the desired operations in accordance with the present invention, but the invention is not restricted to specific circuitry since the invention is concerned with, in addition to circuit details, a system in which the requisite accuracy in a digital servomechanism may be achieved without requiring the utilization of an entire set of coded numbers throughout the control mechanism of the machine. Further, although the apparatus is illustrated as utilizing a cyclic binary code, there is no restriction, within reason, on the type of cyclic code which may be utilized since gating circuits can be devised for most conventional codes to perform desired operations.

The invention has been described throughout as employing voltage generating and recognition circuits, but it is apparent that circuits for generating and recognizing other electric quantities, such as currents, may be employed.

While we have described and illustrated one specific embodiment of our invention, it will be clear that variations of the details of construction which are specifically illustrated and described may be resorted to without departing from the true spirit and scope of the invention as defined in the appended claims.

What we claim as new and desire to secure by Letters Patent of the United States is:

1. A digital servo system comprising a movable member having a plurality of discrete positions, first means for producing a first set of cyclic binary coded voltages, second means for producing a set of cyclic binary coded voltages equal in number to said first set, each of said voltages of a set of voltages representing a binary digit of a different order, the number of voltages of each of said sets being such that the maximum number representable by each set, exclusive of the voltage representing its highest ordered digit, is less than half the total number of said discrete positions which may be assumed by said movable member, said first set of binary coded voltages exclusive of its highest order digit representing a first number indicative of a desired position of said movable member, said second set of binary coded voltages, exclusive of its highest ordered digit representing a second number indicative of the actual position of said movable member, the maximum value of said first and second numbers being greater than the normal expected lag between the actual position of said movable member and its desired position at any instant, conversion means for producing an error signal having a magnitude and polarity determined by the relative values of said first and second numbers, sensing means responsive to a predetermined pattern of the voltages representing the two highest ordered digits of each of said sets of voltages for preventing a reversal of the polarity of said error signal upon a change of one of said first and second numbers from a number at one extreme minimum value, to a number at the other extreme of the range of values of said first and second numbers, and means responsive to said error signal for moving said movable member in such a direction as to tend to reduce said error signal.

2. A digital servo system comprising a movable member having a plurality of discrete positions, first means for producing a first set of cyclic binary coded voltages, second means for producing a second set of cyclic binary coded voltages equal in number to said first set, each of said voltages of a set of voltages representing a binary digit of a different order, the number of voltages of each of said sets being such that the maximum number representable by each set, exclusive of the voltage representing its highest ordered digit, is less than half the total number of said discrete positions which may be assumed by said movable member, said first set of binary coded voltages exclusive of its highest order digit representing a first number indicative of a desired position of said movable member, said second set of binary coded voltages, exclusive of its highest order digit representing a second number indicative of the actual position of said movable member, the maximum value of said first and second numbers being greater than the normal expected lag between the actual position of said movable member and its desired position at any instant, conversion means for producing an error signal having a magnitude and polarity determined by the relative values of said first and second numbers, means for preventing a reversal of the normal polarity of said error voltage upon a change of one of said first and second numbers from a value at one extreme to a value at the other extreme of the range of values of said first and second numbers, said last-mentioned means comprising voltage responsive means for sensing predetermined patterns of the voltages representing the two highest ordered digits of each of said sets of voltages, and means for algebraically adding to said error signal, upon detection of one of said voltage patterns by said voltage responsive means, a compensating signal of a magnitude indicative of a binary number equal to one greater than the maximum value of said first and second numbers and of the same polarity as the normal polarity of said error signal, and means responsive to said error signal for moving said movable member in such a direction as to tend to reduce said error signal.

3. The combination in accordance with claim 2, wherein said conversion means comprises a first plurality of impedances, a first voltage bus means for applying each of said voltages representing said first number to said voltage bus through a distinct one of said first plurality of impedances, the impedance coupling each voltage to said voltage bus having a value equal to twice that of the impedance coupling the voltage representing the next higher order digit to the said voltage bus, a second plurality of impedances, a second voltage bus, means for applying each of said voltages representing said second number to said second voltage bus through a distinct one of said second plurality of impedances, each of said second impedances having a value equal to twice that of the impedance coupling the voltage representing the next high order digit to said second voltage bus and means for algebraically adding the voltages on said voltage buses.

4. The combination in accordance with claim 3, wherein said means for algebraically adding comprises means for applying a compensating voltage to one of said voltage buses and for alternatively adding compensating voltage to the other of said voltage buses upon detection of predetermined ones of said voltage patterns.

5. The combination in accordance with claim 3, wherein said means for algebraically adding comprises means for connecting one of said buses to a compensating voltage and for connecting one of the other of said buses to a compensating voltage and means responsive to said pattern of voltages for removing one of the compensating voltages from one of said buses.

6. A digital servo system comprising a movable member having a plurality of discrete positions, first means for producing a first set of cyclic digitally coded electric signals, second means for producing a second set of cyclic digitally coded electric signals equal in number to said first set, each of said signals of a set of signals representing a digit of a different weight, said first set of coded signals, exclusive of its highest weighted digit, representing a first quantity indicative of a desired position of said movable member, said second set of coded signals, exclusive of its highest weighted digit, representing a second quantity indicative of the actual position of said movable member, the maximum value of said first and second quantities being greater than the normal expected lag between the actual position of said movable member and its desired position at any instant, conversion means for producing an error signal having a magnitude and polarity determined by the relative values of said first and second quantities, sensing means responsive to a predetermined pattern of the signals representing the two highest weighted digits of each of said sets of signals for preventing a reversal of the polarity of said error signal upon a change of one of said first and second quantities from a value at one extreme to a value at the other extreme of the quantity, and means responsive to said error signal for moving said movable member in such a direction as to tend to reduce said error signal.

7. A digital servo system comprising a movable member having a plurality of discrete positions, first means for producing a first set of cyclic binary coded electric signals, second means for producing a second set of cyclic binary coded electric signals equal in number to said first set, each of said signals of a set of signals representing a binary digit of a different order, said first set of binary coded signals, exclusive of its highest ordered digit, representing a first number indicative of a desired position of said movable member, said second set of binary coded signals, exclusive of its highest ordered digit, representing a second number indicative of the actual position of said movable member, the maximum value of said first and second quantities being greater than the normal expected lag between the actual position of said movable member and its desired position at any instant, conversion means for producing an error signal having a magnitude and polarity determined by the relative values of said first and second numbers, sensing means responsive to a predetermined pattern of the signals representing the two highest ordered digits of each of said sets of signals for preventing a reversal of the polarity of said error signal upon a change of one of said first and second numbers from a value at one extreme to a value at the other extreme of the quantity range of said first and second numbers, and means responsive to said error signal for moving said movable member in such a direction as to tend to reduce said error signal.

8. A digital servo system comprising a movable member having a plurality of discrete positions, first means for producing a first set of cyclic binary coded voltages, second means for producing a second set of cyclic binary coded voltages equal in number to said first set, each of said voltages of a set of voltages representing a binary digit of a different order, the number of voltages of each of said sets being such that the maximum number representable by each set, exclusive of the voltage representing its highest order digit, is less than half the total number of said discrete positions which may be assumed by said movable member, said first set of binary coded voltages, exclusive of its highest order digit, representing a first number indicative of a desired position of said movable member, said second set of binary coded voltages, exclusive of its highest order digit, representing a second number indicative of the actual position of said movable member, the maximum value of said first and second numbers being greater than the normal expected lag between the actual position at any instant, conversion means for producing an error signal having a magnitude and polarity determined by the relative values of said first and second numbers, means for preventing a reversal of the normal polarity of said error signal upon a change of one of said first and second numbers from a value at one extreme to a value at the other extreme of the range of values of said first and second numbers, said last-mentioned means comprising voltage responsive means for sensing voltage patterns wherein half the voltages representing the two highest order digits of both of said sets of voltages are of the same value and the voltages representing corresponding digits in said sets of voltages are different, and resistive means for algebraically adding to said error signal, upon detection of one of said voltage patterns by said voltage responsive means, a compensating signal of a magnitude indicative of a binary number equal to one greater than the maximum value of said first and second numbers and of a polarity the same as the normal polarity of said error signal and means responsive to said error signal for moving said movable member in such a direction as to tend to reduce said error signal.

9. The combination in accordance with claim 8, wherein said resistive means adds a voltage of one polarity to the error signal upon detection by said voltage responsive means of patterns wherein the two highest ordered digits represented by one of said sets of voltages are of the same value and wherein the next to highest ordered digit represented by said one of said sets of voltages and the highest ordered digit of the other of sets of voltages are of the same value and wherein said resistive means adds a voltage of the other polarity to said error voltage upon detection by said voltage responsive means of the other of said patterns.

No references cited.